United States Patent
Ahmed et al.

(10) Patent No.: US 10,462,664 B2
(45) Date of Patent: Oct. 29, 2019

(54) SYSTEM AND METHOD FOR CONTROL OF BASEBOARD MANAGEMENT CONTROLLER PORTS

(71) Applicant: DELL PRODUCTS, LP, Round Rock, TX (US)

(72) Inventors: Sajjad Ahmed, Austin, TX (US); Jeffrey M. Lairsey, Round Rock, TX (US); Arulnambi Raju, Austin, TX (US); Minhaz Islam, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 142 days.

(21) Appl. No.: 15/667,181

(22) Filed: Aug. 2, 2017

(65) Prior Publication Data

US 2019/0045358 A1 Feb. 7, 2019

(51) Int. Cl.
| | | |
|---|---|---|
| G06F 1/26 | (2006.01) | |
| H04L 9/32 | (2006.01) | |
| H04W 12/06 | (2009.01) | |
| H04L 29/06 | (2006.01) | |
| H04W 12/04 | (2009.01) | |
| H04L 12/24 | (2006.01) | |
| H04W 12/08 | (2009.01) | |

(52) U.S. Cl.
CPC ............ *H04W 12/06* (2013.01); *H04L 63/06* (2013.01); *H04L 63/083* (2013.01); *H04W 12/04* (2013.01); *H04L 63/105* (2013.01); *H04W 12/08* (2013.01)

(58) Field of Classification Search
CPC ... H04L 63/06; H04L 63/0853; H04L 63/083; H04W 12/04; H04W 12/06; G06F 21/575; G06F 21/572; G06F 21/34; G06F 21/81; G06F 1/26; G06F 11/1417
See application file for complete search history.

(56) References Cited

U.S. PATENT DOCUMENTS

| | | | |
|---|---|---|---|
| 7,200,758 B2 | 4/2007 | Zimmer | |
| 7,873,847 B2* | 1/2011 | Bozek | G06F 1/3209 709/203 |
| 8,732,829 B2 | 5/2014 | Johnson et al. | |
| 8,892,858 B2 | 11/2014 | Smith et al. | |
| 9,125,050 B2 | 9/2015 | Taylor et al. | |
| 9,703,338 B1* | 7/2017 | Nachum | G06F 1/26 |

(Continued)

OTHER PUBLICATIONS

Bonkoski, Anthony, Russ Bielawski, and J. Alex Halderman. "Illuminating the Security Issues Surrounding Lights-Out Server Management." WOOT. 2013. (Year: 2013).*

(Continued)

*Primary Examiner* — Michael Simitoski
(74) *Attorney, Agent, or Firm* — Larson Newman, LLP

(57) ABSTRACT

An information handling system includes a Baseboard Management Controller (BMC) and a communication interface coupled to the BMC. The BMC includes a security co-processor that stores an access key. The access is associated with a first function of the BMC. The communication interface receives a security key from a device external to the information handling system. The BMC directs the security co-processor to determine if the first security key matches the first access key, and unlocks the first function when the first security key matches the first access key.

18 Claims, 4 Drawing Sheets

(56) References Cited

U.S. PATENT DOCUMENTS

| | | | |
|---|---|---|---|
| 2006/0064752 A1* | 3/2006 | Wang | G06F 21/575 726/19 |
| 2006/0155988 A1* | 7/2006 | Hunter | G06F 21/575 713/164 |
| 2007/0130481 A1* | 6/2007 | Takahashi | G06F 21/41 713/300 |
| 2008/0244257 A1 | 10/2008 | Vaid et al. | |
| 2011/0083003 A1* | 4/2011 | Jaber | G06F 21/335 713/2 |
| 2011/0113235 A1* | 5/2011 | Erickson | G06F 21/34 713/152 |
| 2012/0131319 A1* | 5/2012 | Peng | G06F 21/31 713/2 |
| 2013/0007873 A1* | 1/2013 | Prakash | G06F 21/31 726/18 |
| 2014/0248853 A1* | 9/2014 | Shipley | H04W 12/06 455/411 |
| 2014/0282877 A1* | 9/2014 | Mahaffey | H04L 63/0853 726/3 |
| 2015/0006700 A1* | 1/2015 | Wanner | G06F 13/14 709/223 |
| 2015/0089221 A1* | 3/2015 | Taylor | H04W 12/08 713/168 |
| 2016/0350538 A1* | 12/2016 | Young | G06F 21/575 |
| 2017/0012770 A1 | 1/2017 | Lin et al. | |
| 2017/0185780 A1* | 6/2017 | Kao | G06F 21/46 |
| 2017/0230179 A1* | 8/2017 | Mannan | H04L 9/0897 |
| 2019/0034620 A1* | 1/2019 | Khatri | G06F 21/45 |

OTHER PUBLICATIONS

Hargrave, Jordan. "Intelligent Platform Management Interface." POWER 86 (2004). (Year: 2004).*

Yu, Zhilou, and Hua Ji. "Notice of Retraction Research of IPMI Management Based on BMC SOC." Management and Service Science (MASS), 2010 International Conference on. IEEE, 2010. (Year: 2010).*

* cited by examiner

SYSTEM AND METHOD FOR CONTROL OF BASEBOARD MANAGEMENT CONTROLLER PORTS

FIELD OF THE DISCLOSURE

This disclosure generally relates to information handling systems, and more particularly relates to control of baseboard management controller ports.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a Baseboard Management Controller (BMC) and a communication interface coupled to the BMC. The BMC may further include a security co-processor that stores an access key. The access may be associated with a first function of the BMC. The communication interface may receive a security key from a device external to the information handling system. The BMC may direct the security co-processor to determine if the first security key matches the first access key, and unlock the first function when the first security key matches the first access key.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
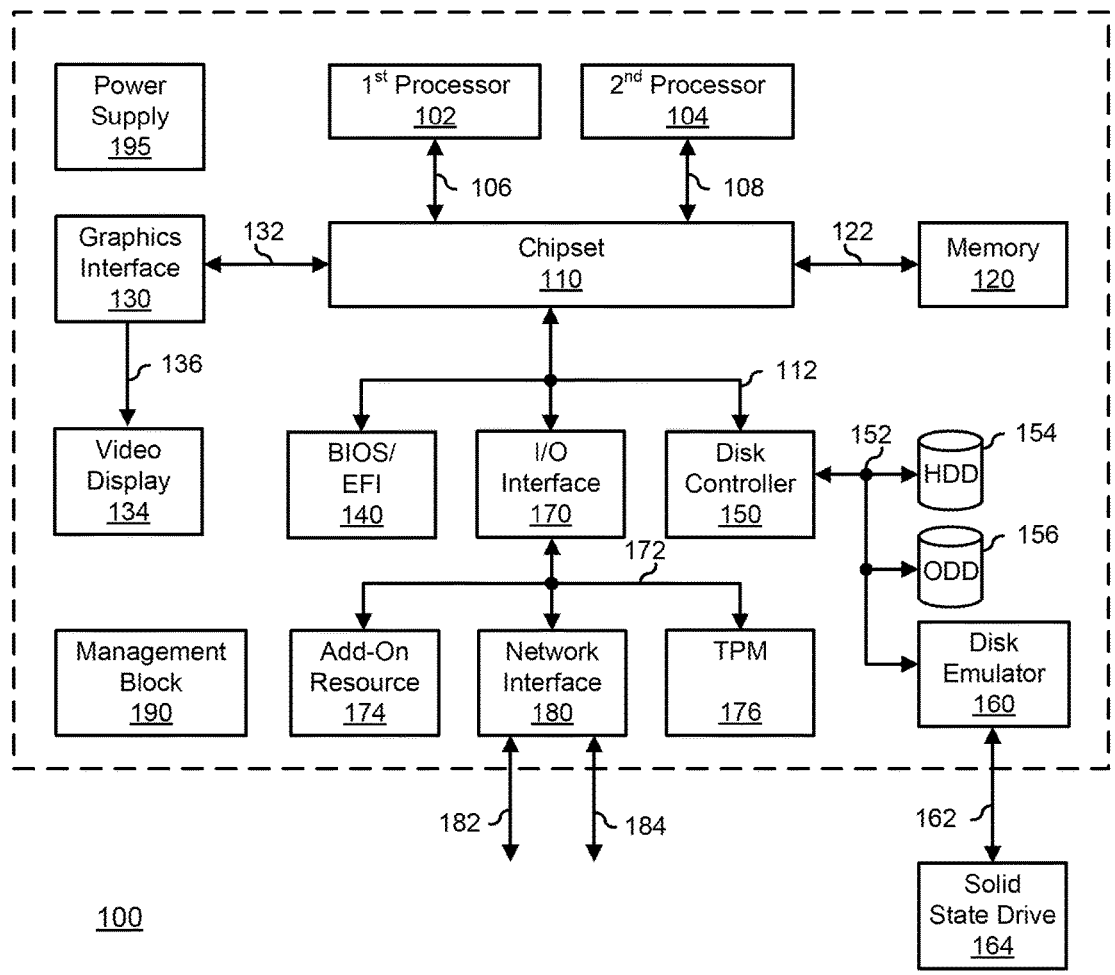
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
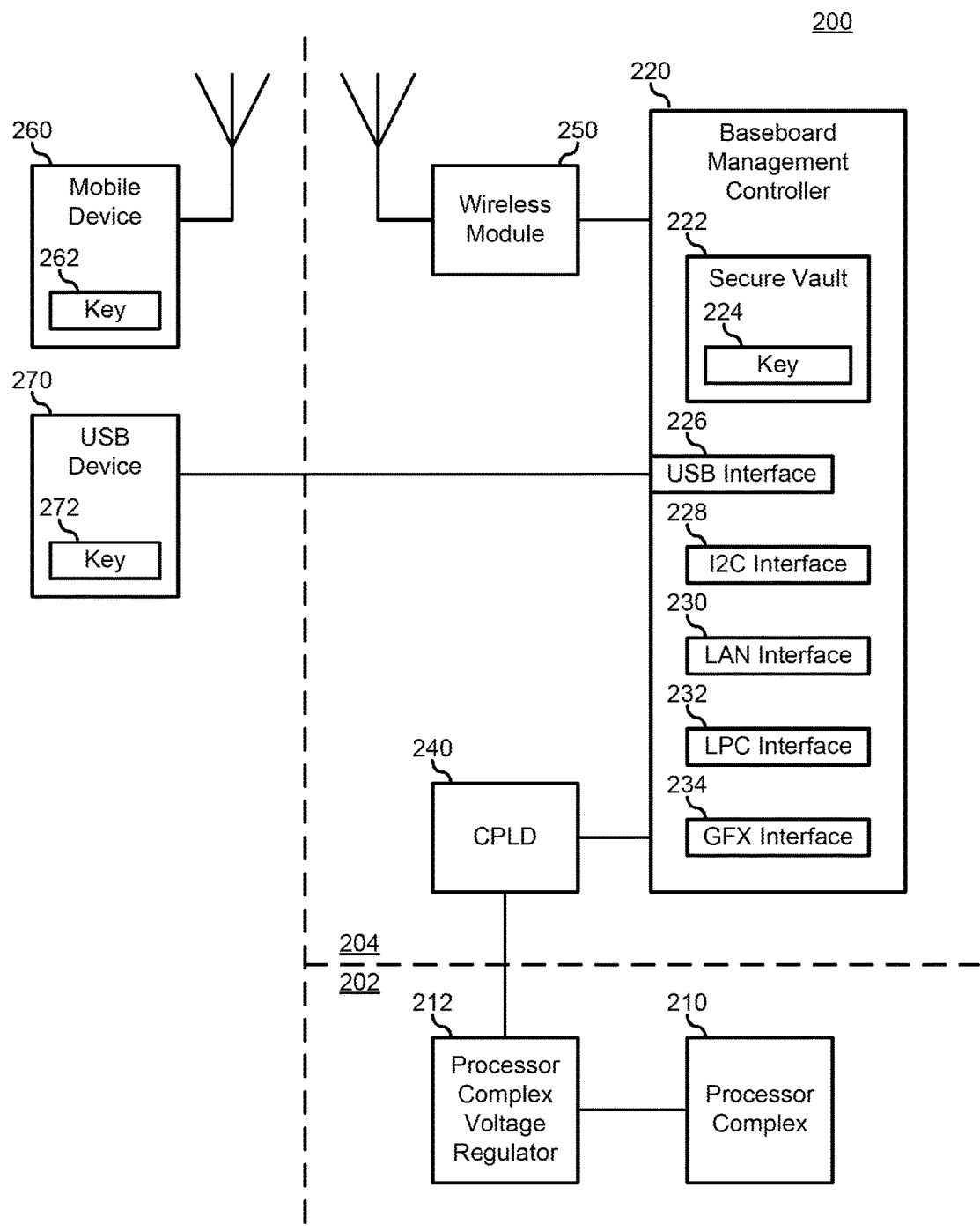
FIG. 2 is a block diagram illustrating an information handling system according to an embodiment of the present disclosure.

FIG. 2 illustrates an information handling system 200 including a host environment 202 and a management environment 204. Host environment 202 includes a processor complex 210 and a processor complex voltage regulator 212. Host environment 202 operates to provide data processing functionality of information handling system 200, such as is typically associated with an information handling system. As such, processor complex 210 represents a data processing apparatus, such as one or more central processing units (CPUs) or processor cores, and the associated data input and output I/O functionality, such as a chipset component, and another I/O processor components. Processor complex 210 operates to execute machine-executable code to perform the data processing tasks associated with information handling system 200. FIG. 2 also illustrates a mobile device 260 and a USB device 270 that are separate from information handling system 200, but that are able to be connected to the information handling system, as described further, below.

Management environment 204 includes a BMC 220, a Complex Programmable Logic Device (CPLD) 240, and a wireless module 250. Management environment 204 operates to implement and manage various maintenance, operation, and system update processes for information handling system 200 that are not typically associated with the data processing functionality of information handling system 200. For example, management environment 204 may provide for out-of-band management of the various code executed on host environment 202, such as BIOS code or UEFI code, firmware code, programs, applications, operating systems, and the like. BMC 220 can utilize an Intelligent Platform Management Interface (IPMI) protocol and one or more additional communication protocols and interfaces to perform the functions and features as described herein. In particular, management block 204 can operate on a different power plane than host environment 202, such that the management block can download and store updated code for the host environment, even when the host environment is powered off. Management environment 204 also operates to monitor and maintain the functions and features of information handling system 200 that are not necessarily associated with the data processing operations performed by host environment 202, such as system thermal and cooling management, fan speed adjustment, power supply monitoring and adjustment, and the like. The mechanisms and method of system management via a BMC are known in the art and are beyond the scope of the present disclosure.

BMC 220 includes a secure vault 222, a Universal Serial Bus (USB) interface 226, an Inter-Integrated Circuit (I2C) interface 228, a Local Area Network (LAN) interface 230, a Low Pin Count (LPC) interface 232, and a graphics interface 234. BMC 220 may include one or more communication interface, as needed or desired. BMC 220 is connected to CPLD 240 to control various functions and features of information handling system 200. In particular, BMC 220 provides various inputs to CPLD 240 to control the power sequencing of the components of host environment 202. For example, BMC 220 can direct CPLD 240 to enable processor complex voltage regulator 212 to provide power to processor complex 210 in accordance with a system boot power on sequence, as dictated by the needs of the particular architecture implemented by the processor complex. In particular, while information handling system 200 may include a power switch that enables processor complex voltage regulator 212 to provide power to processor complex 210, the activity of the processor complex voltage regulator may be configured to only respond to a power on command from BMC 220. For example, a system BIOS or UEFI may include a power on configuration setting that provides that only BMC 220 can initiate a power on of host environment 202

BMC 220 operates to implement and manage the various maintenance, operation, and system update processes for information handling system 200 via USB interface 226, I2C interface 228, LPC interface 230, LAN interface 232, and graphics interface 234. USB interface 226 represents one or more interfaces that provide USB master functionality, USB slave functionality, or USB On-The-Go (OTG) functionality. As such, and as illustrated in FIG. 2, USB interface 226 represents an external interface that includes a connector to which USB device 270 can be installed to provide functionality and features as described further, below. USB interface 226 also represents one or more internal interfaces to various elements of information handling system 200 that can be managed, maintained, operated, and updated by BMC 220. I2C interface 228 represents one or more master or slave I2C interfaces that are connected to one or more I2C busses to various elements of information handling system 200 that can be managed, maintained, operated, and updated by BMC 220. For example, I2C interface 228 can be utilized by BMC 220 to communicate with the Serial Presence Detect (SPD) mechanism of DIMMs of processor complex 210. LAN interface 230 represents an interface to connect BMC 220 to a management network, and can represent an Ethernet or other network protocol connection to the BMC, or can represent an internal connection to a Host Bus Adapter (HBA) that virtualizes network access to the BMC via a PCIe link utilizing a Network Controller Sideband Interface (NCSI), as needed or desired. LPC interface 232 represents an interface for, among other things, providing an emulation of a keyboard and mouse input to processor complex 210, as needed or desired, and graphics interface 234 represents a graphics card functionality for information handling system 200.

BMC 220 is connected to wireless module 250 to permit a user of mobile device 260 to connect to the BMC to gain management access to the functions and features of BMC 220. As such, wireless module 250 represents a wireless data communication interface for short-range wireless communications. For example, wireless module 250 may include a wireless data communication interface for establishing a Personal Area Network (PAN), such as a Near-Field Communication (NFC) interface, a Bluetooth interface, a Bluetooth-Low Energy (Bluetooth-LE) interface, or the like, or for establishing a Wireless Local Area Network (WLAN), such as a WiFi or 802.11 interface or the like, or another wireless interface.

Secure vault 222 represents a storage device of BMC 220 that is configured to provide cryptographically secured information, including passwords, data, encryption keys, code, or other information that requires a high root of trust for the operation of the BMC. In a particular embodiment, secure vault 222 represents a secure storage capacity of a security co-processor, such as a security co-processor of management environment 204 that is in conformance with a Trusted Platform Module specification ISO/IEC 1189. Secure vault 222 includes a access key 224 that operates to unlock various tiered access levels to the functions and features of BMC 220. For example, when information handling system 200 is initially powered on, power can first be provided to management environment 204 and BMC 220 can perform various pre-boot operations before providing direction to CPLD 240 to initiate the boot power-on sequence by processor complex voltage regulator 212. Here, during the pre-boot operations, execution of the functions and features of BMC 220 is halted until access key 224 is unsealed from secure vault 222. In a first case, mobile device 260 establishes a wireless communication link with wireless module 250, and provides a security key 262 to BMC 220. BMC 220 provides security key 262 to secure vault 222, and the secure vault compares security key 262 to access key 224. If security key 262 matches access key 224, then the pre-boot operations are unlocked, and BMC 220 performs the functions and features of the pre-boot operations, including providing direction to CPLD 240 to initiate the boot power-on sequence by processor complex voltage regulator 212 to boot host environment 202. In another case, an administrator plugs USB device 270 into an external USB interface 226, and provides a security key 272 to BMC 220. BMC 220 provides security key 272 to secure vault 222, and the secure vault compares security key 272 to access key 224. If security key 272 matches access key 224, then the pre-boot operations are unlocked, and BMC 220 performs the functions and features of the pre-boot operations, including providing direction to CPLD 240 to initiate the boot power-on sequence by processor complex voltage regulator 212 to boot host environment 202

In a particular embodiment, access key 224 represents two or more access keys as describe above, where each separate access key provides a tiered level of access to the functions and features of the pre-boot operations. For example, the pre-boot operations may be organized into a hierarchical set of access privilege levels. Such access privilege level can include a low access level that permits an administrator to have read access to log information on the status of information handling system 200, a medium access level that permits the administrator to have access to update firmware of host environment 202, and a high access level that permits the administrator to have access to update firmware of management environment 204. Here, access key 224 may represent three separate access keys, each operable to grant one of the low, medium, or high access levels to an administrator that provides the matching security key for each access level. In another, similar embodiment, access key 224 represents two or more access keys as described above, where each separate access key is associated with one or more of interfaces 226, 228, 230 232, and 234, and CPLD 240.

In a particular embodiment, BMC 220 is configured to verify a received security key, such as one of security keys 262 and 272 upon a first in time boot of information handling system 200, and access key 224 is provided in secure vault 222 at the time of manufacture of information handling system 200. In this case, security key 262 or key 272 can be provided to a user of information handling system 200 separately from delivery of the information handling system. In this way, man-in-the-middle attacks on the hardware of information handling system 200 can be prevented because the information handling system will not power on for any purposes whatsoever without the separately provided security key. In a particular embodiment, once the first in time boot of information handling system 200 is performed and access key 222 is used to unlock the pre-boot functions and features of BMC 220, the security key is invalidated, such as by being overwritten or deleted from secure vault 222. In this way, if a man-in-the-middle attack successfully utilizes a matching key, nevertheless, when a user attempts to reuse security key 262, there will be no matching access key in secure vault, and the man-in-the-middle attack can thereby be detected by the bone fide user.

Figure 3:
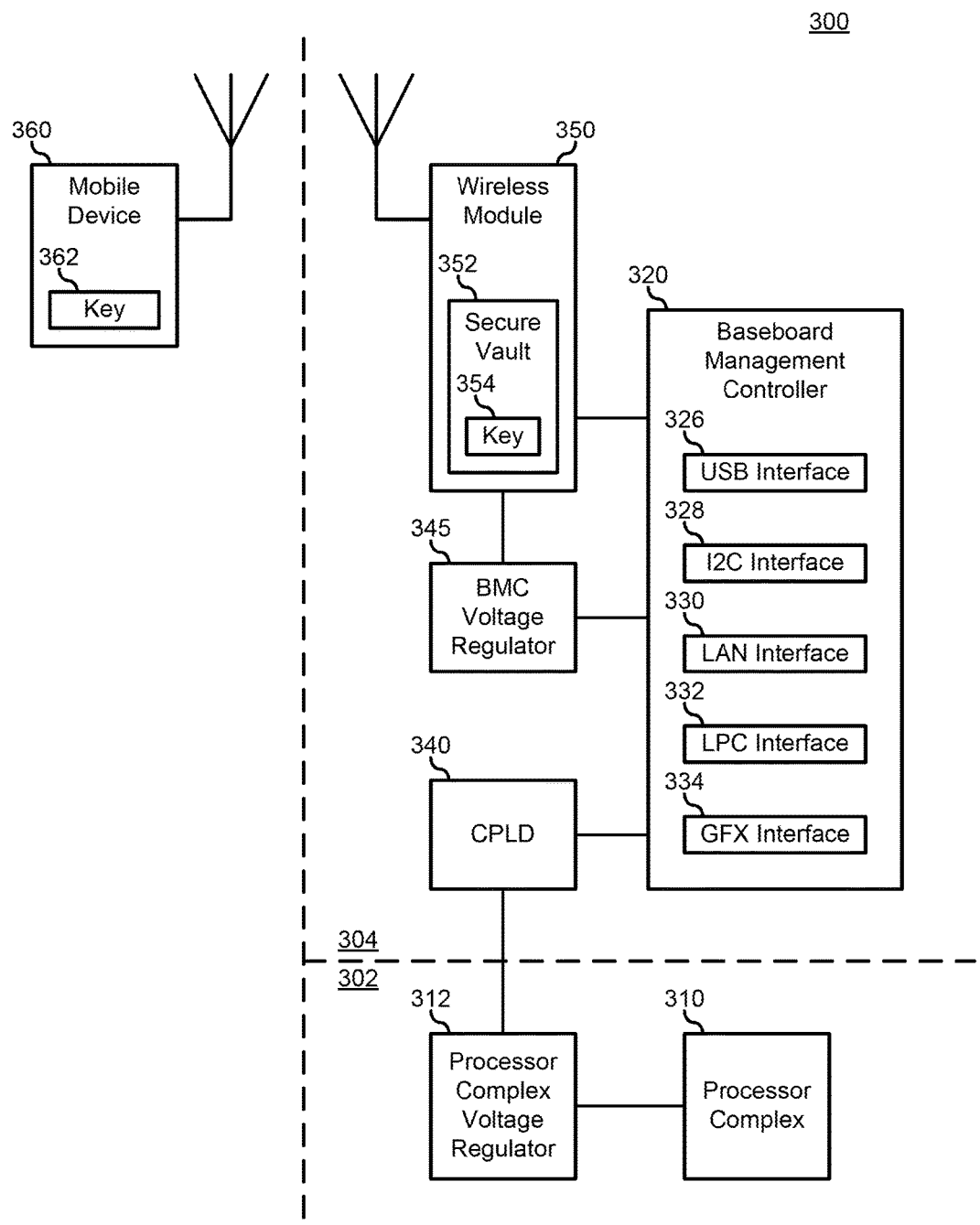
FIG. 3 is a block diagram illustrating an information handling system according to another embodiment of the present disclosure.

FIG. 3 illustrates an information handling system 300 including a host environment 302 similar to host environment 202 and a management environment 304 similar to management environment 204. Host environment 302 includes a processor complex 310 and a processor complex voltage regulator 312. Management environment 304 includes a BMC 320, a Complex Programmable Logic Device (CPLD) 340, a BMC voltage regulator 345, and a wireless module 350. BMC 320 includes a USB interface 326, an I2C interface 328, a LAN interface 330, a LPC interface 332, and a graphics interface 334. BMC 320 is connected to CPLD 340 to provide various inputs to the CPLD to control the power sequencing of the components of host environment 302. BMC 320 operates to implement and manage the various maintenance, operation, and system update processes for information handling system 200 via USB interface 326, I2C interface 328, LPC interface 330, LAN interface 332, and graphics interface 334. BMC voltage regulator 345 operates to provide power to BMC 320.

BMC 320 is connected to wireless module 350 to permit a user of mobile device 360 to connect to the BMC to gain management access to the functions and features of the BMC. Here, wireless module 350 is depicted with a secure vault 352 similar to secure vault 222. Secure vault 352 includes an access key 354 that operates to unlock various tiered access levels to the functions and features of BMC 320. As such, access key 354 may represent two or more access keys that operate similarly to the multiple access keys described above. However, here, wireless module 350 is also depicted as providing a control input to BMC voltage regulator 345 to direct the BMC voltage regulator to provide power to BMC 320. In a particular embodiment, access key 354 operates to unlock powering on of BMC voltage regulator 345. In this way, no functions or features of BMC 320 will become available or operate at all until a matching security key 362 is provided from mobile device 360. Here, no USB device similar to USB device 270 is shown because, until the matching security key 362 that unlocks BMC voltage regulator 345 is received, BMC 320 will have no power from BMC voltage regulator 345. However, once matching security key 362 is provided to secure vault 352 and is matched with access key 354, and wireless module 350 directs BMC voltage regulator 345 to provide power to BMC 320, it will be understood that the BMC may operate to receive additional security keys from an installed USB device, as described above. Moreover, it will be understood that BMC 320 may operate to provide a USB OTG interface that operates to receive power from an installed USB device. In this case, BMC 320 can be configured to detect whether power is supplied from the installed USB device or from BMC voltage regulator 345, and to lock down any transactions from the USB device is the power is not being supplied from the BMC voltage regulator.

The skilled artisan will understand the operations related to verifying security keys in a secure operating environment such as where a security co-processor operates in accordance with the TPM specification. Such operations may include wherein one or more of the security keys provided by either of mobile devices 260 or 360, or by USB device 270 may be self-certifying security keys that can be hashed to a value that can be matched to a hash stored in the secure vaults 222 or 352, as needed or desired to provide added security to the provision of security keys and the detection of tampering with the security keys.

Figure 4:
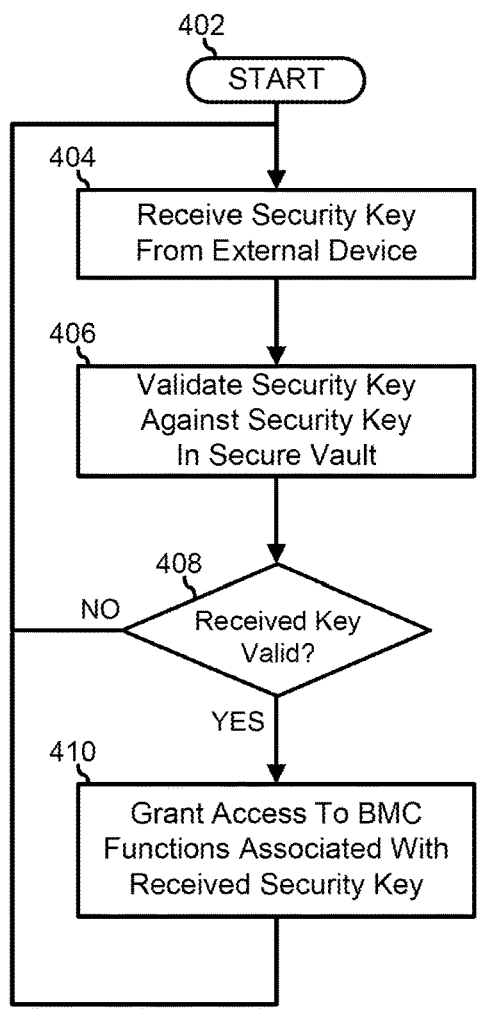
FIG. 4 is a flowchart illustrating a method for securely controlling Baseboard Management Controller ports in an information handling system according to an embodiment of the present disclosure.

FIG. 4 illustrates a method for securely controlling BMC ports in an information handling system, starting at block 402. A security key is received by a device of a management environment of an information handling system from an external device in block 404. For example, mobile device 260 may provide security key 262 to wireless module 250 for forwarding to BMC 220, USB device 270 may provide security key 272 to the BMC, or mobile device 360 may provide security key 362 to wireless module 350. The received security key is validated against an access key in a secure vault of the management environment in block 406. For example, one of security keys 262 or 272 can be compared to access key 222, or security key 362 can be compared to access key 362. A determination is made as to whether or not the received security key matches the access key in the secure vault in decision block 408. If not, the "NO" branch of decision block 408 is taken and the method returns to block 404 to await the receipt of another security key from the external device. Here, no further action is taken by the management environment, effectively locking the information handling system until a valid security key is received. If the received security key matches the access key in the secure vault, the "YES" branch of decision block 408 is taken, the method proceeds to block 410 where access is granted to the functions and features of the management environment that are associated with the received and verified security key, and the method returns to block 404 to await the receipt of another security key from the external device. Here, if only one security key is utilized to unlock the information handling system, this represents the end of the method. However, if various different security keys are utilized to unlock different functions and features of the information handling system, then the return to block 404 represents the ability to receive additional security keys to unlock different functions and features of the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor; and
   a voltage regulator configured to provide power to the processor in response to a signal from a Baseboard Management Controller (BMC);
   the BMC including a security co-processor that stores a first access key, the access key being associated with a first function of the BMC, wherein the first function includes the signal; and
   a first communication interface coupled to the BMC and configured to receive a first security key from a device external to the information handling system;
   the BMC configured to:
      direct the security co-processor to determine if the first security key matches the first access key; and
      unlock the first function when the first security key matches the first access key.

2. The information handling system of claim 1:
   the security co-processor to store a second access key associated with a second function of the BMC;
   the first interface further to receive a second security key form the device;
   the BMC further configured to:
      direct the security co-processor to determine if the second security key matches the second access key; and
      unlock the second function when the second security key matches the second access key.

3. The information handling system of claim 2, wherein the first function comprises enabling communication via a second communication interface, the second communication interface for communicating internally within the information handling system.

4. The information handling system of claim 3, wherein the second function comprises providing power to a processor of the information handling system.

5. The information handling system of claim 1, wherein the first communication interface comprises a wireless communication device configured to receive the first security key from a mobile device.

6. The information handling system of claim 1, wherein the first communication interface comprises a Universal Serial Bus (USB) interface and the external device comprises a USB device.

7. The information handling system of claim 1, wherein the BMC is further configured to:
   delete the first access key from the security co-processor after determining that the first security key matches the first access key.

8. The information handling system of claim 1, wherein the security co-processor comprises a Trusted Platform Module.

9. A method, comprising:
   storing, in a security co-processor of a Baseboard Management Controller (BMC) of an information handling system, a first access key, the access key being associated with a first function of the BMC;

receiving, by a first communication interface coupled to the BMC, a first security key from a device external to the information handling system;

directing, by the BMC, the security co-processor to determine if the first security key matches the first access key; and unlocking the first function when the first security key matches the first access key, wherein unlocking the first function includes providing a signal to a voltage regulator to provide power to a processor of the information handling system.

10. The method of claim 9:

storing, in the security co-processor, a second access key associated with a second function of the BMC;

receiving, by the first interface, a second security key form the device;

directing, by the BMC, the security co-processor to determine if the second security key matches the second access key; and unlocking the second function when the second security key matches the second access key.

11. The method of claim 10, wherein in unlocking the first function, the method further comprises:

enabling communication via a second communication interface, the second communication interface for communicating internally within the information handling system.

12. The method of claim 11, wherein in unlocking the second function, the method further comprises;

providing power to a processor of the information handling system.

13. The method of claim 9, wherein the first communication interface comprises a wireless communication device configured to receive the first security key from a mobile device.

14. The method of claim 9, wherein the first communication interface comprises a Universal Serial Bus (USB) interface and the external device comprises a USB device.

15. The method of claim 9, further comprising:

deleting the first access key from the security co-processor after determining that the first security key matches the first access key.

16. The method of claim 9, wherein the security co-processor comprises a Trusted Platform Module.

17. An information handling system, comprising:

a Baseboard Management Controller (BMC);

a voltage regulator to provide power to the BMC; and a wireless communication device including a security co-processor that stores a first access key, the access key being associated with a first function of the BMC, the wireless communication device configured to:

receive a first security key from a device external to the information handling system;

direct the security co-processor to determine if the first security key matches the first access key; and direct the voltage regulator to provide power to the BMC when the first security key matches the first access key.

18. The information handling system of claim 17, wherein the security co-processor comprises a Trusted Platform Module.

* * * * *